United States Patent [19]

Freyberger et al.

[11] Patent Number: 4,568,967
[45] Date of Patent: Feb. 4, 1986

[54] DIGITAL SIGNAL PROCESSING CIRCUITRY FOR A COLOR-TELEVISION RECEIVER

[75] Inventors: Laurin C. Freyberger, Bahlingen; Friedrich Schmidtpott, Gundelfingen, both of Fed. Rep. of Germany

[73] Assignee: ITT Industries, Inc., New York, N.Y.

[21] Appl. No.: 552,614

[22] Filed: Nov. 17, 1983

[30] Foreign Application Priority Data

Dec. 1, 1982 [EP] European Pat. Off. ......... 82111096.2

[51] Int. Cl.$^4$ ............................................. H04N 9/64
[52] U.S. Cl. ..................................... 358/27; 358/28; 358/30; 358/40
[58] Field of Search ................. 358/21 R, 21 V, 27, 358/28, 30, 40

[56] References Cited

U.S. PATENT DOCUMENTS 4,398,209 8/1983 Robitzsch ............................ 358/27

OTHER PUBLICATIONS

"What is the Impact of Digital TV?", Thomas Fischer, IEEE Transactions on Consumer Electronics, vol. CE-28, No. 3, Aug. 82.

Primary Examiner—Michael A. Masinick
Attorney, Agent, or Firm—Donald J. Lenkszus

[57] ABSTRACT

Digital color signal processing circuitry includes a multiplier which multiplies two demodulated digital color-difference signals by a digital color-saturation signal to provide three time-division-multiplexed signal pairs, each of which is added to the digital luminance signal by an adder. The color-saturation-signal input of the multiplier is preceded by a second multiplier to which the color-saturation signal and multiplier factors stored in a memory (sp) are applied. These multiplier factors are permanently stored by the manufacture of the color-television receiver or can be varied or adjusted during the operation of the receiver. The three adders are followed by three digital-to-analog converters which provide the analog color signals.

40 Claims, 3 Drawing Figures

DIGITAL SIGNAL PROCESSING CIRCUITRY FOR A COLOR-TELEVISION RECEIVER

BACKGROUND OF THE INVENTION

The present invention relates to a digital integrated circuit for a color-television receiver with digital signal processing circuitry which contains a first multiplier which multiplies two demodulated digital color-difference signals with a digital color-saturation signal using time-division multiplexing.

A digital integrated circuit of this kind is disclosed in the publication "DIGIT 2000 VLSI-Digital-TV-System", March 1982, in the form of the description of the integrated circuits MAA 2100 and MAA 2200 on pages 4-3 to 4-5. In FIG. 4-2 on page 4-3, the above-mentioned multiplier is called a "color-saturation multiplier" because it is fed with the demodulated color-difference signals from the preceding stages and with the aforementioned digital color-saturation signal via a stage called "IM bus interface". For the two color-difference signals, time-division multiplexing is used; the same applies to the delivery of the corresponding output signals to the two following digital-to-analog converters for the two analog color-difference signals.

As also described in the publication mentioned above, the two integrated circuits MAA 2100 and MAA 2200 form part of an IC set with which digital color-television receivers can be implemented.

SUMMARY OF THE INVENTION

We have discovered that the color-saturation multiplier of the prior art, besides being usable for this special purpose, can be multiplexed so as to simplify the overall arrangement for digitally processing the received picture signal. Accordingly, an object of the invention is to improve the prior art digital circuit so that the multiplier can be multiplexed.

An advantage offered by the invention is that the analog R-G-B matrix used in the prior art arrangement to generate the analog color signals can be dispensed with because these analog color signals appear at the outputs of the digital-to-analog converters used in the invention. In a modified form, the invention offers the added advantage that the tint-control function required in NTSC color-television receivers can be realized with the color-saturation multiplier as well.

BRIEF DESCRIPTION OF THE DRAWINGS

The invention will now be explained in more detail with reference to the accompanying drawings, in which.

DETAILED DESCRIPTION

In the figures, digital signals are designated by small letters, and analog signals by capital letters.

Figure 1:
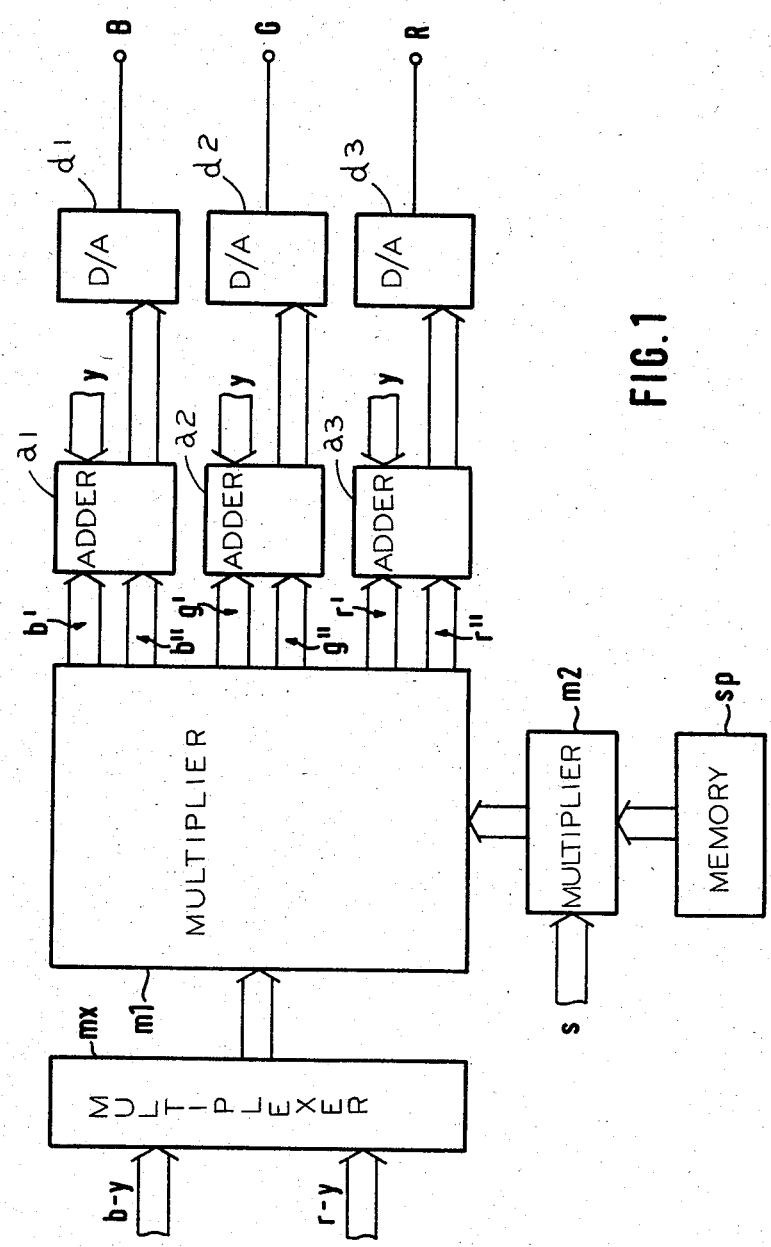
FIG. 1 is a block diagram of an embodiment of the invention.

In the block diagram of FIG. 1, digital color-difference signals b-y, r-y, derived from the transmitted and received television signal in the known manner, are supplied to the multiplexer mx, whose output is connected to one of the two inputs of the first multiplier m1. Connected to the other input, to which the color-saturation signal is applied in the prior art arrangement mentioned above, is the output of the second multiplier m2, whose two inputs are, respectively, fed with the color-saturation signal s and connected to the output of the memory sp.

The first multiplier m1 provides three signal pairs b', b"; g', g"; r', r" on a time-division multiplex basis. The first signals of the pairs are applied to the first inputs of the first, second, and third adders a1, a2, a3, respectively, and the second signals are applied to the respective second inputs. Each adder has a third input to which the digital luminance signal y is applied, which was derived from the transmitted and received television signal in the known manner.

The memory sp contains multiplier factors b1, b2; g1, g2; r1, r2, which are defined as follows:

$b' = s(b-y)b1$, $b'' = s(r-y)b2$
$g' = s(b-y)g1$, $g'' = s(r-y)g2$,
$r' = s(b-y)r1$, $r'' = s(r-y)r2$.

As can be seen, it is possible to influence with these six multiplier factors the composition of the signals provided at the outputs of the three adders a1, a2, a3 and, consequently, the analog signals provided at the outputs of the three digital-to-analog converters d1, d2, d3 following the adders.

The multiplier factors b1, b2; g1, g2; r1, r2, or their numerical values, are permanently stored in the memory sp by the manufacturer of the color-television receiver, or they may be variable or adjustable during operation of the color-television receiver by a corresponding signal fed to the memory. Such adjustability may be considered to be provided by the above-mentioned tint control feature in NTSC color-television receivers, as will be described below. The variability of the multiplier factors contained in the memory sp may also be used to produce color effects in the picture, e.g., by generating, with a suitable circuit, a periodically or temporarily variable signal with which the transmitted and received color combination can be changed, e.g., turned into the complementary colors. Such a variable signal may also originate directly from the transmitted and received color-television signal, as is the case, for example, in a recent variant of the NTSC system, the so-called vertical interval reference (VIR) system, in which on the nineteenth line of each transmitted field, a reference signal for the correct color is transmitted which is used for automatic color correction in the receiver.

If conventional color-picture tubes are to be driven with an analog luminance signal Y according to the known equation $Y = 0.3R + 0.59G + 0.11B$, the multiplier factors have the following decimal numerical values:

$b1 = 1/b^*$; $b2 = r = 0$; $g1 = -0.19b^*$, $g2 = -0.51/r^*$;
$r2 = 1/r^*$, where $b^*$ and $r^*$ are factors by which the blue- and red-minus-luminance signals, respectively, are multiplied at the transmitting end in accordance with the transmitter's color-television standard. For the PAL and NTSC standards, the values of these factors are $b^* = 0.493$ and $r^* = 0.877$, while those for the SECAM standard are $b^* = 1.5$ and $r^* = -1.9$, as is well known.

In the aforementioned special variant of driving conventional color-picture tubes, the numerical values are thus stored in the memory sp by the set manufacturer depending on the television standard for which the color-television receiver is designed. The memory is preferably a static memory, particularly a read-only memory or any of the various kinds of programmable and reprogrammable read-only memories.

The digital circuit in accordance with the invention not only can be used to drive conventional color-picture tubes but also is capable of driving color-picture tubes whose color loci differ from those of conventional color-picture tubes that are driven with an analog luminance signal Y according to the above equation. Such color-picture tubes are driven by the following equation:

$$Y = 0.3R'R + 0.59G'G + 0.77B'B$$

and the multiplier factors have the following decimal numerical values:
B1=1/b*; b2=r1=0; g1=−0.19B'/G'b*, g2=−0.51R'/G'r*; r2=1/r*,
where the factors b* and r* have the same meaning as above. The embodiment just described thus permits nonstandard color-picture tubes to be used for signals transmitted by the usual television standards without the need for significant extra circuitry.

Figure 2:
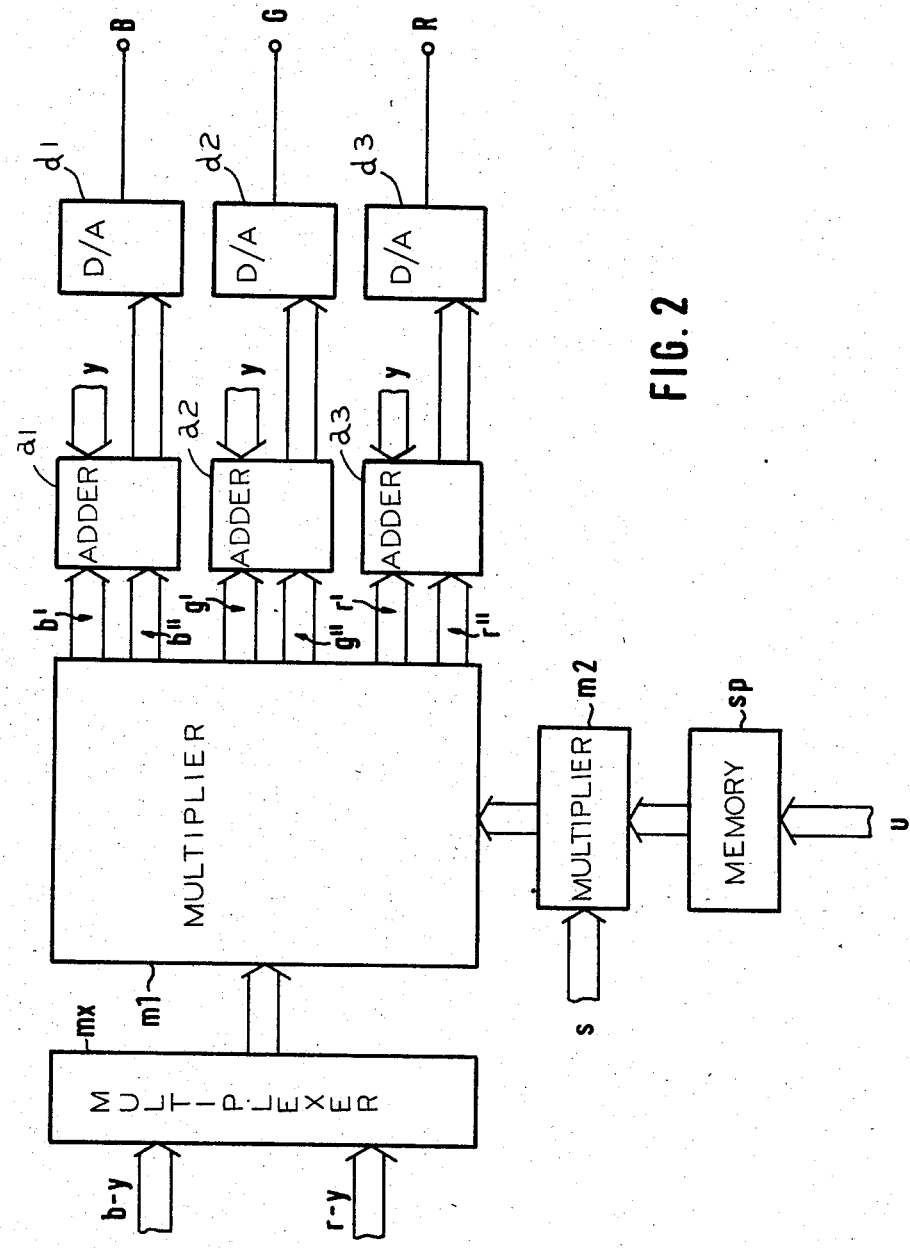
FIG. 2 is a block diagram of another embodiment of the invention.

FIG. 2 shows a block diagram of the above-outlined variant of the invention in which the values of the multiplier factors b1 . . . r2 contained in the memory sp can be changed by application of an external control signal u.

Figure 3:
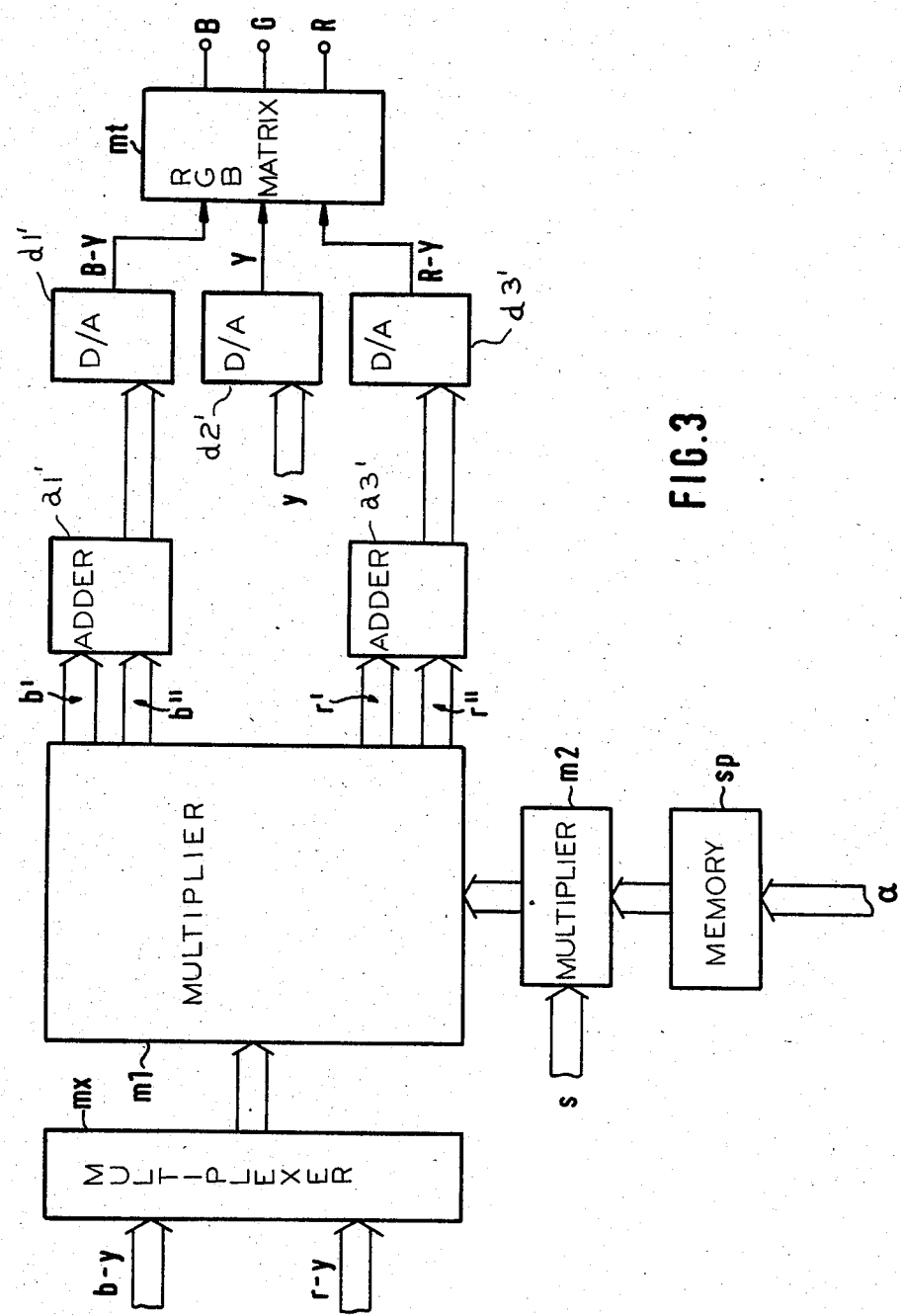
FIG. 3 is a block diagram of an embodiment of the above-mentioned modification of the invention for NTSC color-television receivers.

FIG. 3 shows the block diagram of a modification of the digital circuit according to the invention for color correction ("tint control") in NTSC color-television receivers. The memory sp contains numerical values for the two goniometric functions sin α and cos α and is controlled by a signal representing the corresponding argument α. The two multiplier factors g1 and g2 are zero, so that no values are stored for them, and the second adder a1 of FIGS. 1 and 2 is no longer necessary. The argument α is the phase angle between the digital blue-minus-luminance signal b-y and the color burst, which angle can be set by the user of the color-television receiver or adjusts itself automatically in the recent NTSC system mentioned above.

The remaining adders a1' and a3' in the modification of FIG. 3 are fed only with the signal pairs b', b" and r', r", respectively, but not with the digital luminance signal y; the latter is fed to the second digital-to-analog converter d2', which converts it into the analog luminance signal Y. The two other digital-to-analog converters d1 and d3 convert the output signals of the two adders a1' and a2' into the analog color-difference signals B-Y and R-Y, respectively.

The three analog signals just mentioned are fed to the usual analog R-G-B matrix mt, whose outputs provide the analog color signals B, G, and R.

It should be noted here that in the modification of FIG. 3, the factors b* and r* of the arrangements of FIGS. 1 and 2 do not belong the values stored in the memory sp, as can be seen; they are taken into account in the known manner by a suitable design of the R-G-B matrix mt.

In the arrangement of FIG. 3, the multiplier factors have the following values:
B1=r2=cos α; b2=sin α; r1=−sin α; g1=g2=0.

The negative sine function for the multiplier factor r1 can be realized either by storing the corresponding values in the memory sp in the binary two's complement, for example, or by making the third adder a3' switchable to "subtraction".

What is claimed is:
1. Digital signal processing circuitry comprising:
a multiplier circuit having first inputs for receiving two demodulated digital color difference signals, second inputs for receiving a color-saturation signal, and third inputs for receiving multiplier factors, and having outputs, said multiplier providing a first multiplied pair of signals at one output, a first one of said first pair of signals corresponding to the product of one of said color difference signals, said color-saturation signal and a first one of said multiplier factors, a second one of said first pair of signals corresponding to the product of the other of said color difference signals, said color-saturation signal and a second one of said multiplier factors, said multiplier providing a second multiplexed pair of signals at a second output, a first one of said second pair of signals corresponding to the product of said one of said color difference signals, said color-saturation signal and a third one of said multiplier factors, a second one of said second pair of signals corresponding to the product of said other of said color difference signals, said color-saturation signal and a fourth one of said multiplier factors;
a first adder having first inputs coupled to said multiplier and second inputs for receiving a digital luminance signal, said first adder adding said first pair of multiplexed signals and said digital luminance signal to provide signals at outputs;
a second adder having first inputs coupled to said multiplier and second inputs for receiving said digital luminance signal, said second adder adding said second pair of multiplexed signals and said digital luminance signal to provide signals at outputs.

2. A signal processing circuitry in accordance with claim 1 comprising:
a first digital to analog converter having digital inputs coupled to said first adder outputs and having analog outputs; and
a second digital to analog converter having digital inputs coupled to said second adder outputs and having analog outputs.

3. Signal processing circuitry in accordance with claim 2, wherein said multiplier circuit comprises
a first multiplier for receiving said color-saturation signal and said plurality of multiplier factors and providing first, second, third and fourth products of said color-saturation signal with said first, second, third and fourth multiplier factors, respectively; and
a second multiplier for multiplying said first color difference signal with each of said first and second products and said second color difference signal with each of said third and fourth products.

4. Signal processing circuitry in accordance with claim 1 comprising:
a memory for storing said first, second, third and fourth multiplier factors and having outputs coupled to said multiplier for supplying thereto said first, second, third and fourth multiplier factors.

5. Signal processing circuitry in accordance with claim 2 comprising:
a memory for storing said first, second, third and fourth multiplier factors and having outputs coupled to said multiplier for supplying thereto said first, second, third and fourth multiplier factor.

6. Signal processing circuitry in accordance with claim 3 comprising:
a memory for storing said first, second, third and fourth multiplier factors and having outputs coupled to said multiplier for supplying thereto said first, second, third and fourth multiplier factor.

7. Signal processing circuitry in accordance with claim 4, wherein said memory has an input whereby said first, second, third and fourth multiplier factors may be varied or adjusted.

8. Signal processing circuitry in accordance with claim 5, wherein said memory has an input whereby said first, second, third and fourth multiplier factors may be varied or adjusted.

9. Signal processing circuitry in accordance with claim 6, wherein said memory has an input whereby said first, second, third and fourth multiplier factors may be varied or adjusted.

10. Signal processing circuitry in accordance with claim 2 comprising:
a third digital to analog converter for converting said digital luminance signal to an analog signal; and
an R-G-B matrix having inputs coupled to said first, second, and third digital to analog converters.

11. Signal processing circuitry in accordance with claim 10, wherein said multiplier circuit comprises
a first multiplier for receiving said color-saturation signal and said plurality of multiplier factors and providing first, second, third and fourth products of said color-saturation signal with said first, second, third and fourth multiplier factors, respectively; and
a second multiplier for multiplying said first color difference signal with each of said first and second products and said second color difference signal with each of said third and fourth products.

12. Signal processing circuitry in accordance with claim 10 comprising:
a memory for storing said first, second, third and fourth multiplier factors and having outputs coupled to said multiplier for supplying thereto said first, second, third and fourth multiplier factor.

13. Signal processing circuitry in accordance with claim 11 comprising:
a memory for storing said first, second, third and fourth multiplier factors and having outputs coupled to said multiplier for supplying thereto said first, second, third and fourth multiplier factor.

14. Signal processing circuitry in accordance with claim 12, wherein said memory has an input whereby said first, second, third and fourth multiplier factors may be varied or adjusted.

15. Signal processing circuitry in accordance with claim 13, wherein said memory has an input whereby said first, second, third and fourth multiplier factors may be varied or adjusted.

16. Signal processing circuitry in accordance with claim 4, wherein said memory is a read only memory.

17. Signal processing circuitry in accordance with claim 5, wherein said memory is a read only memory.

18. Signal processing circuitry in accordance with claim 6, wherein said memory is a read only memory.

19. Signal processing circuitry in accordance with claim 12, wherein said memory is a read only memory.

20. Signal processing circuitry in accordance with claim 13, wherein said memory is a read only memory.

21. Signal processing circuitry in accordance with claim 1, wherein
said multiplier provides a third multiplexed pair of signals at a third output, a first one of said third pair of signals corresponding to the product of said one color difference signal, said color-saturation signal and a fifth multiplier factor, a second one of said third pair of signals corresponding to the product of said other of said color difference signals, said color-saturation signal and a sixth multiplier factor; and
said circuitry further comprises a third adder having first inputs coupled to said multiplier and second inputs for receiving said digital luminance signal, said third adder adding said third pair of multiplexed signals and said luminance signal to provide signals at outputs.

22. A signal processing circuitry in accordance with claim 21 comprising:
a first digital to analog converter having digital inputs coupled to said first adder outputs and having analog outputs;
a second digital to analog converter having digital inputs coupled to said second adder outputs and having analog outputs; and
a third digital to analog converter having digital inputs coupled to said third adder outputs and having analog outputs.

23. A digital integrated circuit for a color-television receiver with digital signal processing circuitry comprising:
a first multiplier having first inputs for receiving for multiplying a first demodulated digital color difference signal with second digital signals and a second demodulated digital color difference signal with said second digital signals to provide three multiplexed signal pair outputs;
a second multiplier for multiplying a color-saturation signal with each of a plurality of multiplier factors to provide said second digital signals;
a memory storing each of said plurality of multiplier factors and coupled to said second multiplier for supplying thereto said plurality of multiplier factors, said multiplier factors being defined as follows:

$b' = s(b-y)b1,$ $b'' = s(r-y)b2,$ $g' = s(b-y)g1,$ $g'' = s(r-y)g2,$ $r' = s(b-y)r1,$ and $r'' = s(r-y)r2$ where s is the color-saturation signal, b-y is the first color difference signal, r-y is the second color difference signal b' and b'' are a first pair of said three multiplexed signal pair outputs, g' and g'' are a second pair of said three multiplexed signal pair outputs, r' and r'' are a third pair of said multiplexed signal pair outputs, and b1, b2, g1, g2, r1 and r2 are said multiplier factors;
a first adder for adding said b' and b'' signal pair with a digital luminance signal;

a first digital to analog converter having its digital input coupled to the output of said first adder for providing an analog blue signal;

a second adder for adding said g' and g" signal pair with said digital luminance signal;

a second digital to analog converter having its digital input coupled to the output of said second adder for providing an analog green signal;

a third adder for adding said r' and r" signal pair with said digital luminance signal; and a third digital to analog converter having its digital input coupled to the output of said third adder for providing an analog red signal.

24. A digital integrated circuit in accordance with claim 23, wherein said multiplier factors are permanently stored in said memory.

25. A digital integrated circuit in accordance with claim 23, wherein said multiplier factors may be adjusted during operation of said receiver in accordance with a third digital signal.

26. A digital integrated circuit in accordance with claim 24, wherein said multiplier factors may be adjusted during operation of said receiver in accordance with a third digital signal.

27. A digital integrated circuit in accordance with claim 23, for driving a color picture tube with an analog luminance signal Y where $Y=0.3R+0.5G+0.11B$, wherein said multiplier factors have the following decimal numerical values:

$b1=1/b^*$, $b2=0$, $r1=0$, $r2=1/r^*$, $g1=-0.19b^*$, and $g2=-0.51/r^*$ where $b^*$ and $r^*$ are factors by which the blue- and red-minus-luminance signals, respectively, are multiplied at the transmitting color signal source in accordance with a predetermined color television standard.

28. A digital integrated circuit in accordance with claim 27, wherein said standard is the PAL or NTSC standard and $b^*=0.493$ and $r^*=0.877$.

29. A digital integrated circuit in accordance with claim 27, wherein said standard is the SECAM standard and $b^*=1.5$ and $r^*=-1.9$.

30. A digital integrated circuit in accordance with claim 23 for driving a color picture tube having a color loci different from that of a conventional color picture tube with an analog luminance signal Y where $Y=0.3R'R+0.59G'G+0.11B'B$, wherein said multiplier factors have the following decimal numerical values:

$b1=1/b^*$, $b2=0$, $g1=-0.19B'/G'b^*$, $g2=-0.51R'/G'r^*$, $r1=0$, and $r2=1/r^*$ where $b^*$ and $r^*$ are factors by which the blue-minus-luminance and red-minus-luminance signals, respectively, are multiplied at the source of color signals in accordance with a predetermined color television standard.

31. A digital integrated circuit in accordance with claim 30, wherein said standard is the PAL or NTSC standard and $b^*=0.493$ and $r^*=0.877$.

32. A digital integrated circuit in accordance with claim 30, wherein said standard is the SECAM standard and $b^*=1.5$ and $r^*=-1.9$.

33. A digital integrated circuit for a color-television receiver with digital signal processing circuitry comprising:

a first multiplier having first inputs for receiving for multiplying a first demodulated digital color difference signal with second digital signals and a second demodulated digital color difference signal with said second digital signals to provide two multiplexed signal pair outputs;

a second multiplier for multiplying a color-saturation signal with each of a plurality of multiplier factors to provide said second digital signals;

a memory storing each of said plurality of multiplier factors and coupled to said second multiplier for supplying thereto said plurality of multiplier factors, said multiplier factors being defined as follows:

$b'=s(b-y)b1$, $b''=s(r-y)b2$, $r'=s(b-y) r1$, and $r''=s(r-y)r2$ where s is the color-saturation signal, b-y is the first color difference signal, r-y is the second color difference signal b' and b" are a first pair of said two multiplexed signal pair outputs, r' and r" are a second pair of said multiplexed signal pair outputs, and b1, b2, r1 and r2 are said multiplier factors;

a first adder for adding said b' and b" signal pair;

a first digital to analog converter having its digital input coupled to the output of said first adder for providing an analog B-Y signal;

a second digital to analog converter receiving a digital luminance signal at its digital input for providing an analog luminance signal;

a second adder for adding said r' and r" signal pair; and a third digital to analog converter having its digital input coupled to the output of said second adder for providing an analog R-Y signal.

34. A digital integrated circuit in accordance with claim 33, wherein said multiplier factors have the following values:

$b1=\cos \alpha$ $b2=\sin \alpha$ $r1=-\sin \alpha$ $r2=\cos \alpha$ where α is the phase angle between the digital blue-minus-luminance signal and a color burst signal.

35. A digital integrated circuit in accordance with claim 34, wherein α can be set by the user of the receiver.

36. A digital integrated circuit in accordance with claim 34, wherein α is automatically adjusted.

37. A digital integrated circuit in accordance with claim 33, wherein said B-Y, R-Y and luminance signals are coupled to an analog R-G-B matrix.

38. Signal processing circuitry in accordance with claim 7, wherein said multiplier factor may be adjusted in accordance with a Vertical Interval Reference signal.

39. Signal processing circuitry in accordance with claim 8, wherein said multiplier factor may be adjusted in accordance with a Vertical Interval Reference signal.

40. Signal processing circuitry in accordance with claim 9, wherein said multiplier factor may be adjusted in accordance with a Vertical Interval Reference signal.

* * * * *